March 8, 1932. D. M. MARTINDILL 1,848,896
BRAKE BOOSTER FOR MOTOR VEHICLES
Filed Feb. 26, 1931
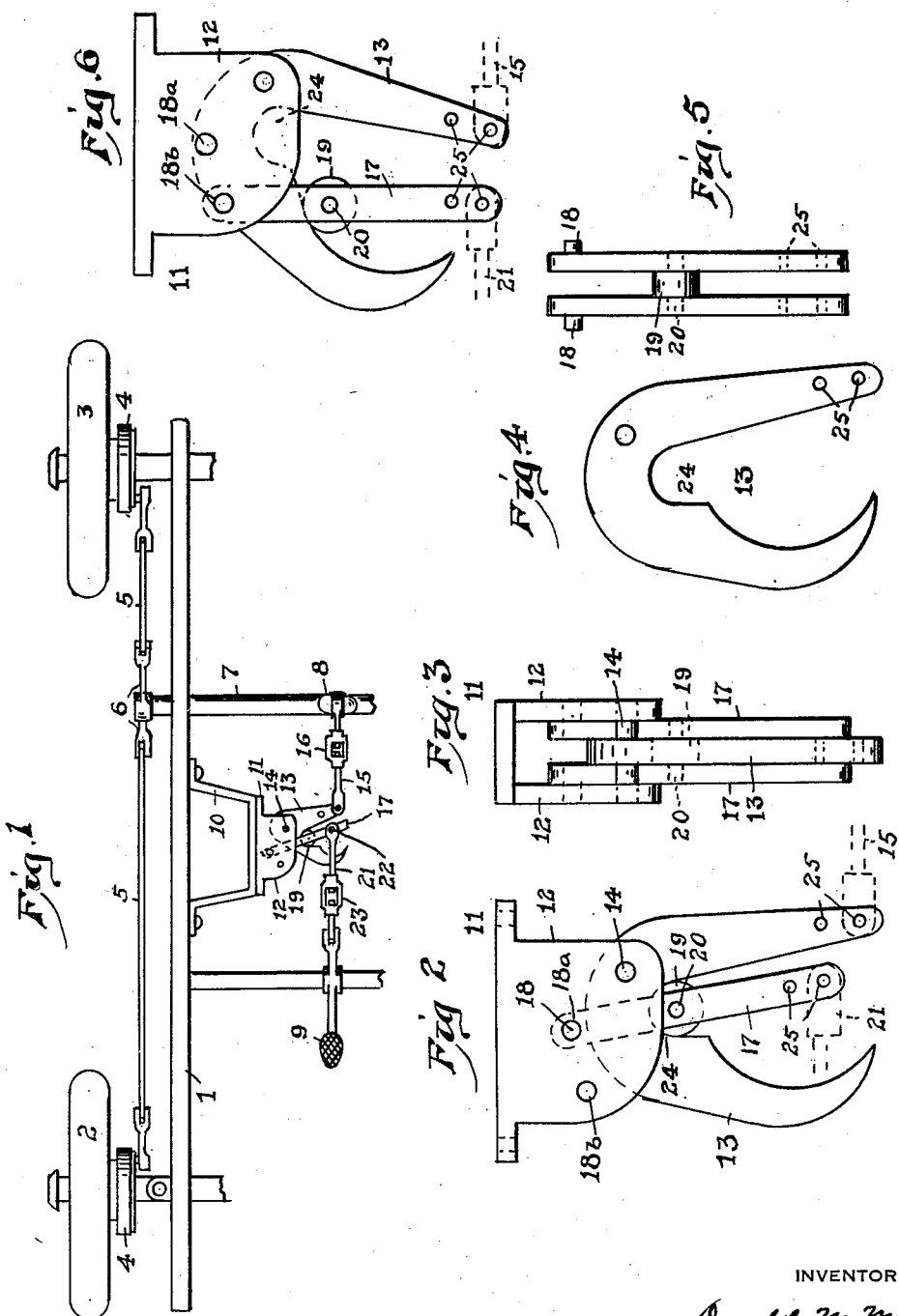
INVENTOR
Donald M. Martindill
by Edward A. Lawrence,
his attorney.

Patented Mar. 8, 1932

1,848,896

UNITED STATES PATENT OFFICE

DONALD M. MARTINDILL, OF YOUNGSTOWN, OHIO

BRAKE BOOSTER FOR MOTOR VEHICLES

Application filed February 26, 1931. Serial No. 518,323.

Usually motor vehicles such as motor trucks, are in use loaded beyond their rated capacity, and thus a burden is placed upon the brakes which the latter were originally not designed to carry. Therefore it is necessary to amplify the braking power of the service or other brakes of the vehicle so that the increased load may be taken care of safely.

This amplification is usually provided for by means of what is termed a "booster" and which is a leverage-amplifying mechanism interposed between the foot treadle or other actuating member and the brakes.

The object which I have in view is the provision of a new and more simplified booster mechanism, which easily and at small cost may be applied to the brake mechanism of a motor vehicle, and which will be more effective in increasing the braking power and effect.

Generally speaking my improved booster mechanism comprises a lever of the first class and a lever of the second class having moving contact with each other, the first class lever being the leverage lever which is connected to the brakes while the second class lever is the pull lever which is connected to the foot treadle or other actuating member.

The leverage lever is angular or bent and is pivotally supported adjacent its angle while its tail or the end which is unconnected to the brakes is provided with a perimetral edge which acts as a track upon which travels a roller carried by the pull lever, the angularity of such track relative to the other end of the leverage lever determining the leverage which the pull lever exerts on the leverage lever and also the progressive increase of such leverage as the brakes are applied.

Preferably the pull lever is double so as to straddle the tail of the leverage lever and the roller is mounted between the two members of the pull lever.

Other novel features of construction and also of arrangement of parts will appear from the following description.

In the accompanying drawings wherein I have illustrated a practical embodiment of the principles of my invention, Fig. 1 is a broken plan view of the chassis of a motor vehicle illustrating the front and rear brakes, the treadle for operating the brakes and my improved booster interposed in the brake operating mechanism.

Fig. 2 is an enlarged plan view of the booster mechanism.

Fig. 3 is a side elevation of the same looking from the right in Fig. 2.

Fig. 4 is a side elevation of the leverage lever which is connected to the equalizer shaft of the brakes.

Fig. 5 is an elevation of the double pull lever which is connected to the treadle.

Fig. 6 is a view similar to Fig. 2 but illustrating a different set up for the pull lever.

Referring first to Figs. 1 to 5, inclusive, of the drawings, 1 represents one of the side bars or members of the vehicle chassis, and 2 and 3 the front and rear wheels, which are provided with the brakes 4. The brakes are connected as by the links 5 to the cranks 6 of the equalizer shaft 7. Intermediate of its length the shaft 7 is provided with a crank arm 8.

9 represents the actuating member of the brakes. This is usually a foot treadle but also may be a hand lever. For convenience I hereinafter refer to it as the treadle.

10 represents a horizontally disposed bracket attached to the bar 1 and extending inwardly toward the longitudinal axis of the chassis. Mounted on the inner end of said bracket is a three sided boxing 11 having parallel side walls 12 which extend inwardly.

13 represents an angular lever pivotally mounted between the walls 12 and adjacent its angle as on the pin 14 whose ends are secured in said walls. The stem or outer end of said lever is connected to the crank arm 8 by a link 15 which may be provided with a turnbuckle 16 for length adjustment. The lever 13 is the leverage lever of the mechanism.

The pull lever comprises the twin levers 17 whose inner ends are provided with trunnions 18 journaled in bearing holes 18a in the walls 12. The members 17 straddle the tail of the lever 13 and a roller 19 is mounted on a cross pin 20 connecting the two members 17 intermediate of their length, and said roller rides on the inner edge of the tail of the lever 13, said edge forming a track upon which said roller travels.

Between the outer ends of the members 17 is interposed the eye which forms the end of a link 21, a pin 22 extending through the eye and through registering holes in the members 17. The link 21 connects with the treadle 9 and it is preferably provided with a turnbuckle 23 for length adjustment.

The angle of the lever 13 is provided with an arcuate recess 24 in which the roller 19 engages when the brakes are released and when the treadle is depressed to apply the brakes, the initial movement of the pull lever 17 in a counterclockwise direction in Figs. 1 and 2 causes the roller to first climb the wall of said recess, thus taking up slack or lost motion, and then to travel along the perimetral edge of the tail of the lever 13, causing said lever to also swing in a counterclockwise direction and thus apply the brakes.

The inner edge or track of the tail of the lever 13 is arcuate and eccentric to the axis of the swing of the lever 17, so that leverage is exerted on the lever 13 by the movement of the lever 17, and said track is so disposed that such leverage increases as the brakes are applied. The outer end of the track swings in with an increased curvature or rise, so that as the brakes are set the resistance of further movement is such as to inform the operator that the roller is traveling too far and adjustment is necessary.

It is evident that by providing the roller track with the proper angularity or curvature relative to the other end of the lever 13 the desired amplification of the leverage exerted by the treadle may be obtained and such leverage may be caused to increase in the desired ratio as the movement proceeds.

I have shown the walls 12 of the boxing 11 provided with a second pair of alined journal holes 18b in which the trunnions 18 of the members of the levers 17 may be journaled. Thus the pull lever may be set, as shown in Fig. 6, so that the roller will not seat in the recess 24 when the brakes are released but will always be in contact with the track, and thus the setting of the brakes begins when the pressure is first applied to the treadle.

The two levers are each provided with two or more holes 25 for attachment of the connecting links, thus enabling the leverage exerted in connection with the two levers and also the relative leverage of the two levers to be varied and regulated.

My improved booster is of simple and inexpensive yet durable and rugged construction. It may be quickly installed in the brake system of any motor vehicle and it provides means whereby the necessary amplification of the braking power may be readily obtained.

What I claim is:—

1. A brake-booster mechanism for motor-vehicles comprising a support carried by the vehicle, a first class lever pivotally mounted intermediate of its ends on said support and having one end linked to the brakes, a second class lever pivotally mounted at its inner end on said support and having its outer end linked to the brake-treadle, and a roller mounted on said second class lever intermediate of its ends and riding on the lateral surface of the unconnected end of the first class lever.

2. A brake-booster mechanism for motor-vehicles comprising a support carried by the vehicle, an angular first class lever pivotally mounted adjacent its angle on said support and having its outer end linked to the brakes, a second class lever having its inner end pivotally mounted on said support and having its outer end linked to the brake-treadle, and a roller mounted on the second class lever intermediate of its ends and riding on the lateral surface of the inner end of the first class lever.

3. A brake-booster mechanism for motor-vehicles comprising a support carried by the vehicle, a first class lever pivotally mounted intermediate of its ends on said support and having its outer end linked to the brakes, a double second class lever pivotally mounted at its inner end on said support, and straddling the inner end of the first class lever, the outer end of the second class lever being linked to the brake-treadle, and a roller mounted between the members of the second class lever and riding on the lateral surface of the inner end of the second class lever.

4. A brake-booster mechanism for motor-vehicles comprising a support carried by the vehicle, an angular first class lever pivotally mounted adjacent its angle on said support and having one end linked to the brakes, a double second class lever having its inner end pivotally mounted on said support and straddling the inner end of the first class lever, the outer end of the second class lever being linked to the brake-treadle, and a roller carried by the second class lever intermediate of its ends and riding on the lateral surface of the inner end of the first class lever.

5. A brake-booster mechanism for motor-vehicles comprising a housing mounted on the vehicle and provided with parallel walls, a first class lever pivotally mounted intermediate of its ends between said walls and having its outer end linked to the brakes, a second class lever having its inner end pivotally mounted between said walls and having its outer end linked to the treadle, and a roller mounted on the second class lever intermediate of its ends and riding on the lateral surface of the inner end of the first class lever.

6. A brake-booster mechanism for motor-vehicles comprising a housing mounted on the vehicle and provided with parallel walls, a first class lever pivotally mounted intermediate of its ends between said walls and having its outer end linked to the brakes, a second class lever having its inner end pivotally mounted between said walls and having its outer end linked to the treadle, said second class lever being double and straddling the inner end of the first class lever, and a roller mounted on the second class lever intermediate of its ends and riding on the lateral surface of the inner end of the first class lever.

7. A brake-booster mechanism for motor-vehicles comprising a housing mounted on the vehicle and having parallel walls, an angular first class lever pivotally mounted adjacent its angle between said walls and having its outer end linked to the brakes, a second class lever having its inner end pivotally mounted between said walls and having its outer end linked to the treadle, and a roller mounted on the second class lever intermediate of its ends and riding on the lateral surface of the inner end of the first class lever.

8. A brake-booster mechanism for motor-vehicles comprising a housing mounted on the vehicle and having parallel walls, an angular first class lever pivotally mounted adjacent its angle between said walls and having its outer end linked to the brakes, a second class lever having its inner end pivotally mounted between said walls and having its outer end linked to the treadle, the second class lever being double and straddling the inner end of the first class lever, and a roller mounted on the second class lever intermediate of its ends and riding on the lateral surface of the inner end of the first class lever.

9. A brake-booster mechanism for motor-vehicles, comprising a support, an angular leverage lever pivotally mounted adjacent its angle on said support and having one end connected to the brakes and the other end of said leverage lever having an arcuate contact surface, a pull lever pivotally connected at one end to said support and having its other end connected to the treadle, and a roller mounted on the pull lever intermediate of the ends of said lever and arranged to travel on said contact surface as the pull lever is caused to swing, the curvature of said surface being eccentric to the axis of the pull lever's movement.

10. A brake-booster mechanism for motor-vehicles, comprising a support, an angular leverage lever pivotally mounted adjacent its angle on said support and having one end connected to the brakes and the other end of said leverage lever having an arcuate contact surface, a pull lever pivotally connected at one end to said support and having its other end connected to the treadle, and a roller mounted on the pull lever intermediate of the ends of said lever and arranged to travel on said contact surface as the pull lever is caused to swing, the curvature of said surface being eccentric to the axis of the pull lever's movement, the outer end of said surface being provided with a riser to rapidly increase the leverage as the pull lever completes its operative swing.

11. A brake-booster mechanism for motor-vehicles, comprising a support, an angular leverage lever pivotally mounted adjacent its angle on said support and having one end connected to the brakes and the other end of said leverage lever having an arcuate contact surface, a pull lever pivotally connected at one end to said support and having its other end connected to the treadle, and a roller mounted on the pull lever intermediate of the ends of said lever and arranged to travel on said contact surface as the pull lever is caused to swing, the curvature of said surface being eccentric to the axis of the pull lever's movement, the inner end of said contact surface being provided with a recess which is occupied by the roller when the brakes are released.

Signed at Youngstown, O., this 23d day of February, 1931.

DONALD M. MARTINDILL.